March 31, 1959    J. J. PARKER ET AL    2,879,682
SPLINED ARTICLE HOLDER USING BALL CAMS
Filed May 16, 1957
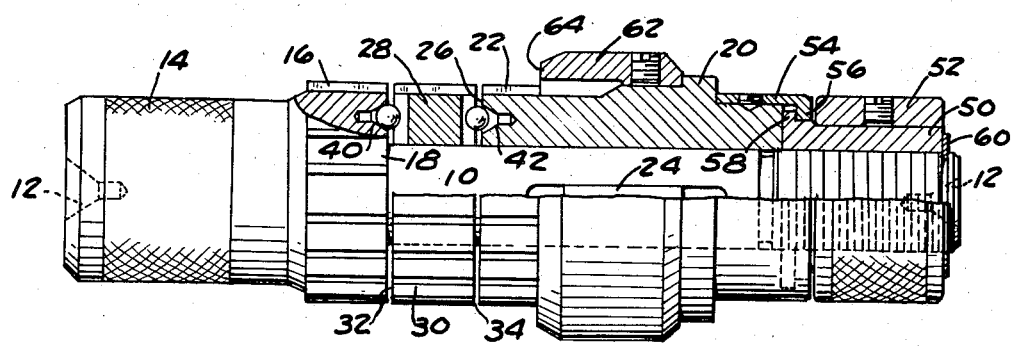
Fig. 1
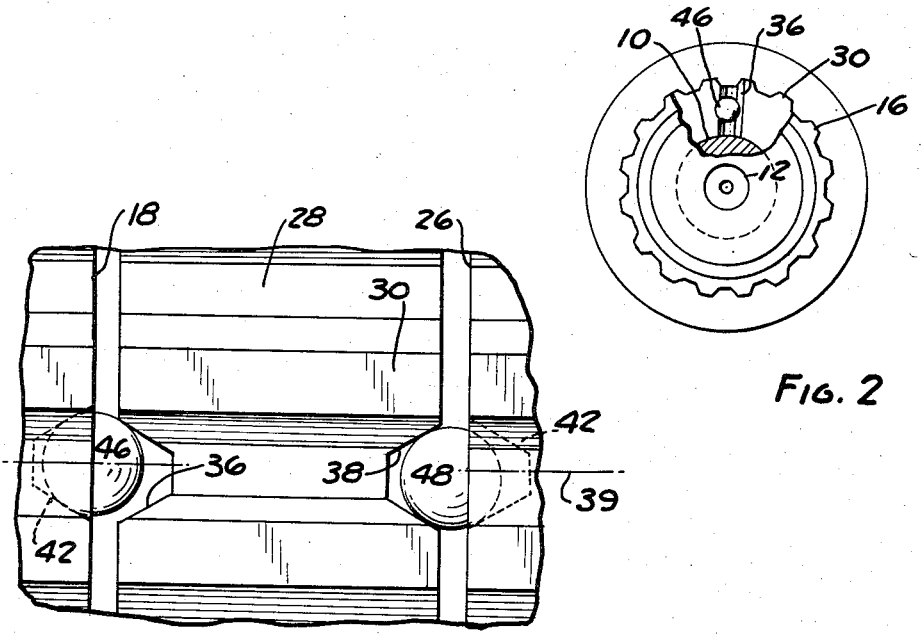
Fig. 2
Fig. 3
INVENTORS
JOHN J. PARKER & LONDON T. MORAWSKI
BY
ATTORNEYS.

United States Patent Office 2,879,682
Patented Mar. 31, 1959

2,879,682

SPLINED ARTICLE HOLDER USING BALL CAMS

John J. Parker and London T. Morawski, Detroit, Mich.

Application May 16, 1957, Serial No. 659,547

7 Claims. (Cl. 82—43)

This invention relates to work-holding devices particularly for work pieces having splines or gear teeth thereon, by engagement with which a work piece is held for performing machining or gaging operations thereon.

It is an object of the present invention to provide a construction for holding a work piece having teeth thereon in which a pair of axially spaced work-engaging members having aligned teeth may be moved axially to cause rocking movement of a third work-engaging member having matching teeth in a manner to clamp a toothed work piece with a high degree of accuracy as to centering and axial alignment between the teeth of the work piece and the teeth of the work-holding devices.

In devices of this character, the rocking movement may be produced by means of helical or other inclined camming surfaces which act to convert the axial movement of the outer members into a rocking movement of the third or inner toothed member. Because of the inclined cams, the production of chucks, arbors, and work holders of this class is somewhat expensive and since each work-holder is suitable for only a single size of spline or gear, the expense in providing individual work-holders for a large variety of parts becomes excessive.

It is an object of the present invention to provide a work-holder of the class described which may be produced with a high degree of accuracy and at a low cost.

Another object is to provide such a device wherein the helical or inclined camming means makes use of one or more ordinary hardened steel balls together with camming surfaces which may be machined accurately at low cost.

Further objects and advantages of the present invention will be apparent from the following description, reference being had to the accompanying drawing wherein a preferred form of the present invention is illustrated.

In the drawing:

Fig. 1 is a side view partly broken away, showing one form of the present invention.

Fig. 2 is an end view also partly broken away, showing the device in Fig. 1.

Fig. 3 is an enlarged top view of a portion of the device shown in Fig. 1.

In the drawing, there is illustrated a work-holding arbor comprising a central shaft 10 having centers 12 at its opposite ends. At its left end, the shaft 10 is enlarged to provide a knurled handle 14 and is also provided with an integral set of spline-engaging teeth 16 which may form a first work-engaging member. To the right of the teeth 16, the shaft 10 is reduced in diameter and presents a flat face 18 facing toward the right in Fig. 1. Slideably keyed on the shaft 10 is a second work-engaging member 20 having a set of spline-engaging teeth 22. Teeth 22 are machined so as to be in axial alignment with the teeth 16 and the member 20 is maintained in an angularly fixed position with respect to shaft 10 by a key 24. The left end of the member 20 presents a face 26, facing to the right and also generally flat.

Intermediate the faces 18 and 26, there is mounted for rotation upon shaft 10 a third work-engaging member 28 having spline-engaging teeth 30 which match the teeth 16 and 22 but may be rocked into and out of alignment therewith. For this purpose, the member 28 presents generally flat faces 32 and 34 juxtaposed to the faces 18 and 26 respectively, and provided with radially extending grooves 36 and 38 (see Fig. 3).

These grooves may be readily machined across the end faces of the member 28 and are provided with the inclined side walls as clearly shown in Fig. 3. These walls being inclined to the axis of the arbor, indicated at 39 in Fig. 3, serve as cams in a manner hereafter to be described. The faces 18 and 26 are each provided with a conical recess 40 and 42 respectively, within each of which is received a hardened steel ball 46 and 48. The depth of these recesses is such that the balls project into the grooves 36 and 38.

The right hand end of the shaft 10 is threaded to receive a nut 50 having a knurled collar 52 attached thereto. The left hand edge of nut 50 abuts against the right hand end of member 20 and serves to force the latter toward the other toothed members. A retainer ring 54 is attached to the member 20 and has an inwardly turned flange 56 which overlaps an outwardly projecting flange 58 on the nut 50. This serves to cause the member 20 to be retracted toward the right when the nut 50 is threaded in that direction. A snap ring 60 is provided on the end of shaft 10 to limit the retraction movement of the nut 50. The member 20 may carry a stop ring 62 secured thereto for the purpose of providing a shoulder at 64 against which work pieces may abut for proper positioning endwise on the teeth 16, 22, and 30.

In operation, the nut 50 is backed off to the position shown in Fig. 1 which leaves some available space between the opposed faces of the three toothed work engaging members. The balls 46 and 48 are loosely retained in their respective recesses and grooves so that there is some freedom of motion not only of the balls to move into and out of the recesses and grooves, but also some freedom of the member 28 to rock through a limited angle with respect to the members 16 and 22. In Fig. 3, the ball 46 is shown fully engaged in its recess 42 with clearance at one side wall of the groove 36. The ball 48 on the other end is shown in engagement with both walls of groove 38 but with clearance in the recess 42 at one side thereof.

When it is desired to clamp a splined work-piece or an internal gear upon the arbor, the work-piece is merely slid endwise upon the teeth 16, 30 and 22 until it abuts the shoulder 64. Thereafter, the nut 50 may be threaded toward the left to bring the opposed faces 18 and 26 toward each other. This causes the balls 46 and 48 to partake of a camming or wedging action at the respective grooves and recesses, which forces the inner member 28 to rock about the axis of shaft 10, producing misalignment between the teeth 30 on the one hand and teeth 16 and 22 on the other hand. Thus, opposing torques are created upon the side faces of the teeth of the work piece to clamp the same tightly upon the arbor.

It will be seen that the camming action may take place either along the side face of the groove as shown at the left in Fig. 3, or may take place along the side of the conical recess as shown at the right in Fig. 3.

It will thus be seen that the present invention provides a work-piece holder which may be used to clamp a splined or toothed work-piece by opposing torques exerted upon the side faces of the teeth which may be manufactured accurately at low cost.

Furthermore, the use of standard steel balls together with simple straight grooves and conical recesses make possible the use in inexpensive machining operations. It will further be noted that by using a conical recess at one side of a ball and radial groove at the other side, there is no need for having accurate spotting of either the recess or the groove, since the ball is free to accommodate itself radially wherever the recess happens to be spotted. In addition, this avoids the setting-up of forces tending to urge the rocking member or the sliding member toward an eccentric position.

While the form of embodiment of the invention as herein disclosed constitutes a preferred form, it is to be understood that other forms might be adopted, all coming within the scope of the claims which follow.

What is claimed is as follows:

1. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces, a pair of balls forming contact between the third member and the first pair of members, each ball being recessed into the faces of two of the members by recesses, at least one of which has a surface inclined to the rocking axis whereby, as the first faces are drawn together, the balls will cam the third member into engagement with the sides of the spline teeth.

2. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces, a pair of balls forming contact between the third member and the first pair of members, each ball being recessed into the faces of two of the members by recesses, at least one of which has a surface inclined to the rocking axis and one of which comprises a radially extending groove, whereby, as the first faces are drawn together, the balls will cam the third member into engagement with the sides of the spline teeth.

3. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces and means forming a pair of oppositely facing registering recesses in at least one pair of juxtaposed faces and presenting a camming surface inclined to the rocking axis, and a ball positioned in said recesses forming a contact piece against the camming surface.

4. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces, means forming a pair of oppositely facing registering recesses in at least one pair of juxtaposed faces and one of which comprises a radially extending groove presenting a camming surface inclined to the rocking axis, and a ball positioned in said recesses forming a contact piece against the camming surface.

5. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces, means forming a pair of oppositely facing registering recesses in at least one pair of juxtaposed faces and one of which comprises a conical hole presenting a camming surface inclined to the rocking axis, and a ball positioned in said recesses forming a contact piece against the camming surface.

6. A construction for holding a splined work-piece comprising a pair of axially spaced work-engaging members having a set of aligned teeth thereon arranged to engage the spline of the work-piece and having opposed generally flat faces, means for drawing the faces toward each other while maintaining the teeth aligned, a third work-engaging member rockably mounted between said faces and having teeth rockable into and out of alignment with the first set of teeth and having its end faces juxtaposed to the first-mentioned faces, means including a groove extending radially and a conical hole forming a pair of oppositely facing registering recesses in at least one pair of juxtaposed faces and each presenting a camming surface inclined to the rocking axis, and a ball positioned in said recesses forming a contact piece against the camming surface.

7. A construction for holding a splined work piece comprising a shaft having a first spline engaging member fixed axially and rotatably thereon, a second spline engaging member mounted on the shaft for rotation and for movement axially toward and away from the first member, said members having matching teeth thereon which, when the second member is rotated in opposite directions, are shifted into and out of alignment for gripping and releasing the splined formation of the work piece, said members having juxtaposed end faces, one of said end faces having a radially extending slot therein, said slot having converging side walls, the other of said juxtaposed end faces having a conical socket therein, a hardened ball in said socket having a diameter such that when it is seated in said socket, it projects axially beyond the end face in which the socket is formed, the projecting portion of said ball projecting into said radial slot and means for drawing the second member towards the first member to rock the second member by the interengagement of said ball with the tapered wall of said socket and the converging walls of said groove to thereby clamp the work piece on the misaligned teeth of the first and second members.

References Cited in the file of this patent

UNITED STATES PATENTS

| | | |
|---|---|---|
| 2,665,136 | Fallon | Jan. 5, 1954 |
| 2,762,629 | Dalby | Sept. 11, 1956 |